CIRCUIT ARRANGEMENT FOR FRAME CORRECTION

Filed April 21, 1966

INVENTOR.
JORG WOLBER
BY
Frank R. Jifani
AGENT

CIRCUIT ARRANGEMENT FOR FRAME CORRECTION

Filed April 21, 1966

INVENTOR.
JÖRG WÖLBER
BY
Frank R. Jifari
AGENT

United States Patent Office 3,433,998
Patented Mar. 18, 1969

3,433,998
CIRCUIT ARRANGEMENT FOR FRAME CORRECTION

Jörg Wölber, Hamburg-Stellingeh, Germany, assignor to North American Philips Company, Inc., New York, N.Y., a corporation of Delaware Filed Apr. 21, 1966, Ser. No. 544,262
Claims priority, application Germany, Apr. 24, 1965, P 36,612
U.S. Cl. 315—27 4 Claims
Int. Cl. H01j 29/76

ABSTRACT OF THE DISCLOSURE

A pincushion correction system for television circuits employs a transductor with an E–I core. The control winding on the center leg is in series in the vertical deflection circuit, and a capacitor is connected in parallel with this winding to produce a resonant circuit, with unsaturated core, that has a period two to three times the line stroke period. The windings on the outer legs of the core are in series, and the series connection is in parallel in the horizontal deflection circuit. The outer windings are connected so that only one can be saturated at a time by the control winding. Each outer winding, in saturated condition, has an inductance that is in resonance with the capacitor at a frequency with a period from 0.5 to 1.5 times the line stroke period.

The invention relates to a circuit arrangement for correcting the deflection of a cathode-ray tube, particularly a television picture tube, by transductor transmission of a first correction quantity from a first deflection circuit, namely a line deflection circuit, to a second deflection circuit, namely a frame deflection circuit, and of a second correction quantity from the second to the first deflection circuit, the operative winding of a transductor supplying the second correction quantity being arranged in the first deflection circuit with a comparatively high frequency and the control winding of the said transductor being arranged in the second deflection circuit, a conversion member constructed as a capacitance being connected to the said control winding.

According to U.S. patent application Ser. No. 505,540, filed Oct. 28, 1965, the limbs of the ferromagnetic core which support the parts of the operative windings are considerably magnetized dissymmetrically at least during part of the cycle of the first deflection oscillations, while a member which is constructed as a capacitance and which converts the oscillations induced from the operative windings with a comparatively high frequency, is connected to the control winding.

With such a capacitance a particularly simple correction circuit is obtained having a very small transductor and an extremely low need for energy if, according to the invention, the inductance of the control winding operating in the outermost limbs at low magnetic flux density is tuned to the capacitance so that the voltage across the capacitance increases approximately sinusoidally in time from the middle of the line stroke period until a transition instant dependent upon the frame deflection current which instant lies at an average generating angle of at least 50° to at most 70° of the said sine curve, and that, from the transition instant, the said voltage decreases approximately cosinusoidally in an oscillatory circuit, which at high magnetic flux density of the outermost limbs is formed by the active selfinductance of the operating winding through the control winding with the said capacitance and which is tuned so that at an average value of the frame deflection current approximately 90° of a cosinusoidal oscillation are traversed in which the said voltage, owing to the symmetrical construction of the transductor, has a shape which, from the middle of the line fly-back period up to the next middle of the stroke period, is identical to the shape already described but of opposite polarity.

The active inductance of the control winding is influenced on the one hand by the inductances present in the external circuit, for example, of the frame or vertical deflection coils and on the other hand by the fact whether the control winding at low saturation in the outermost limbs is decoupled magnetically from the operative winding or whether the transductor, at strongly different saturation of the outermost limbs, operates as a transformer.

In this case a good linearity of the voltage across the capacitance with an amplitude dependent upon the vertical deflection current and thereby a line frequency correction of the vertical deflection current which is parabolic to a high extent is obtained while correction contributions which are linear to a high extent are supplied for the horizontal deflection current.

In order that the invention may be readily carried into effect, it will now be described in greater detail, by way of example, with reference to the accompanying drawings, in which FIGURE 1 diagrammatically shows the correction circuit as is used also in the example of the main application.

FIGURE 2 diagrammatically shows the construction of the transductor.

Figures 1, 2:
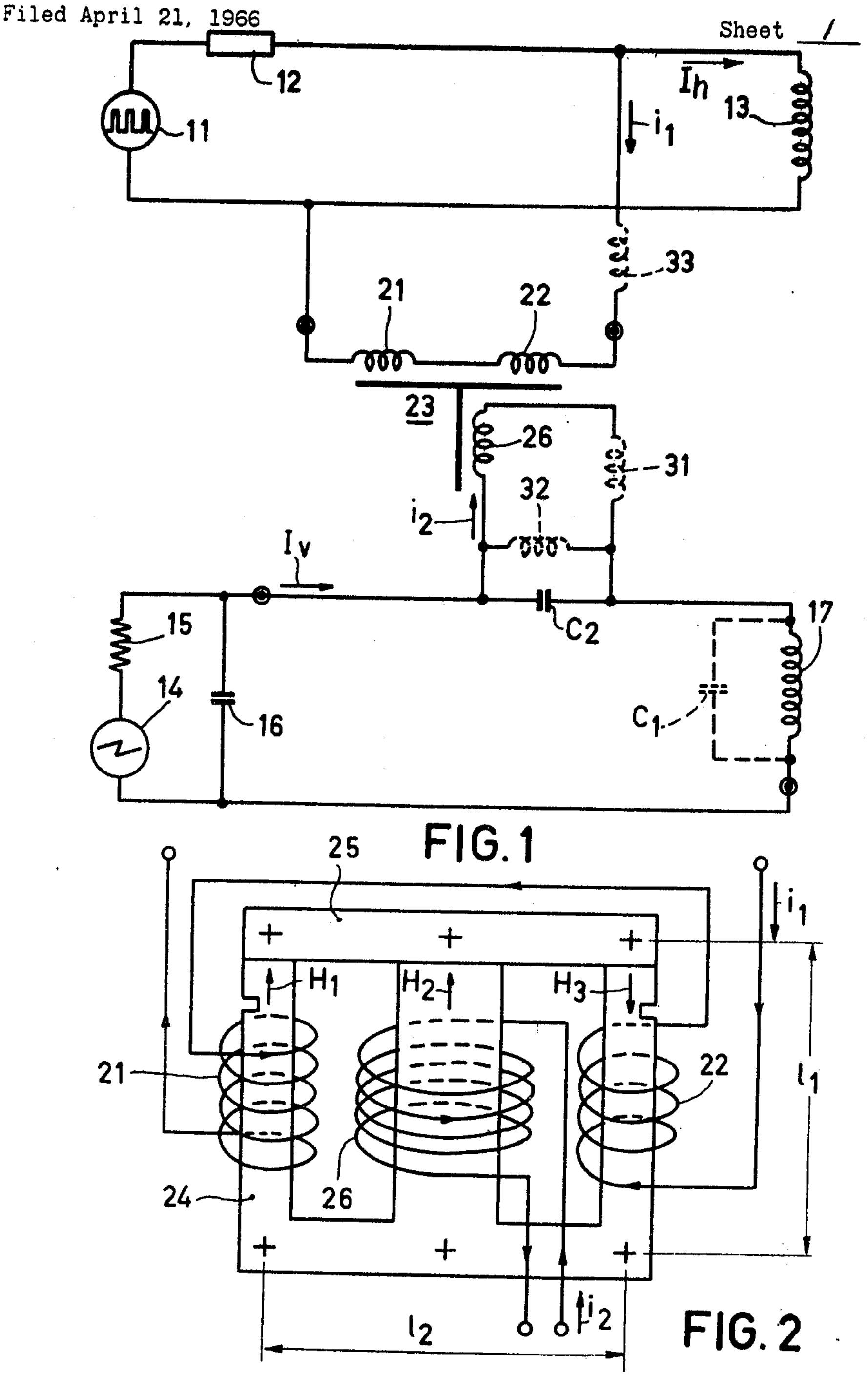

In FIGURE 1 a sawtooth current I of relatively high frequency (for example, 15,625 c./s.) is supplied by a generator 11 for the horizontal deflection (line deflection) of a television receiver having a predominantly inductive internal impedance 12 to the horizontal deflection coil 13 the impedance of which is substantially formed by an inductance $L_h$. In this case the desired sawtooth line deflection current is obtained when the generator 11 supplies an approximately pulsatory voltage $U_h$.

In a corresponding manner a generator 14 having an internal resistor 15 supplies a sawtooth current $I_v$ having a low frequency (for example, 50 c./s.) to the coils 17 for the vertical deflection (frame deflection). For the vertical deflection oscillations the coils 17 have substantially a real impedance; therefore, the desired sawtooth current is produced by a substantially sawtooth voltage of the generator 14. The generator 14 and the internal resistor 15 thereof are shunted by a capacitor 16 for oscillations having the horizontal deflection frequency. However, for these oscillations having the horizontal deflection frequency, the inductive component $L_v$ of the deflection coil 17 makes itself strongly felt.

The operative winding consisting of two parts 21 and 22 of a transductor 23 is connected parallel to the horizontal deflection coils 13. As shown in FIGURE 2, the transductor 23 may consist of an E-shaped core 24 having an I-shaped yoke 25 comprising on its outer limbs the parts 21 and 22 of the operative winding and on the central limb a control winding 26. The oppositely wound parts 21 and 22 of the winding are connected in series with one another so that they are rigidly coupled together at low magnetic flux density. This is due to the fact that, when the outermost limbs are not saturated, that is to say at low magnetic flux density of the said limbs, nearly no lines of force pass from the outer limbs to the central limb. Therefore, in this condition, the parts 21 and 22 of the winding together have a high inductance $L_a$. In addition, the fact that the lines of force of the outermost limbs do not pass through the central limb has for its result that no voltage is induced in the control winding 26 by the windings 21 and 22. As long as the outermost limbs are not saturated, however, no voltages are induced in the operative winding 21, 22 from the control winding 26, since these voltages neutralize one another for the greater part owing to the opposite winding sense of the parts 21 and 22 of the winding. This means that, as long as the outermost limbs are not saturated, the operative and control windings are decoupled from one another to a high extent. According to the invention, the material of the core 24, 25 is chosen, to say, to be rectangular. This means that, in principle, the material may be in a non-saturated and in a saturated condition. In a non-saturated condition, which occurs when the magnetic field strength H and consequently the magnetic flux density B is low, the permeability $\mu$ of the material is large. In the saturated condition, which occurs only after the field strength H has exceeded the limit value, the permeability $\mu$ is small. Whether in a line period the outermost limbs are saturated, depends upon the amplitude of the vertical deflection current flowing through the control winding 26. Only when this occurs are the operative and control windings coupled together magnetically.

According to the aforesaid application the ends of the control winding 26 are connected to a capacitor $C_2$ operating as a converting element, the said capacitor being connected in series with the generator 14 and the deflection coils 17 in the vertical deflection circuit.

With the winding sense indicated in FIGURE 2 and the likewise indicated directions of the current $i_1$ through the operative winding 21,. 22 and of the current $i_2$ through the control winding 26 the magnetic field lines (H) and thus also the magnetic fluxes ($\Phi$) are of equal direction in the outermost limb on the left side in the drawing and in the central limb and are of opposite direction in the outermost limb on the right-hand side in the figure.

Figure 3:
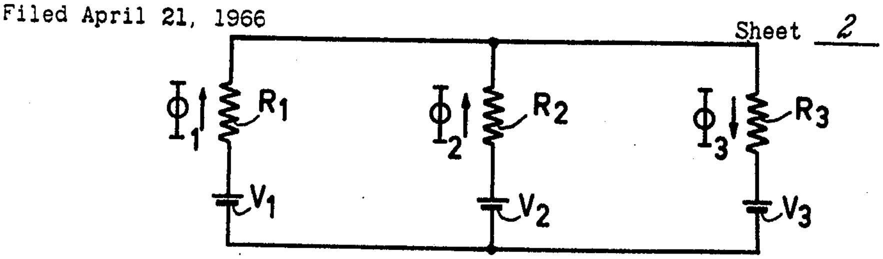
FIGURE 3 shows an equivalent circuit diagram of the transductor with the magnetic fluxes.

FIGURE 3 shows the magnetic equivalent circuit diagram for the transductor shown in FIGURE 2, in which in the separate branches the magnetic voltages $V_m=n.i$ corresponding to the product of the number of turns $n$ and the current $i$ of the associated (partial) winding and the magnetic resistances R resulting from the cross-section O of the core, its length L and the permeability $\mu$ of the core material are denoted in which, as is known, it holds that $$\Phi=\frac{\frac{n.i}{l}}{\mu O}=\frac{V_m}{R}$$

As a result of this magnetic fluxes $\Phi$ are generated in the separate branches in such manner that the magnetic flux $\Phi_3$ in the right-hand limb is equal to the sum of the magnetic fluxes $\Phi_1$ and $\Phi_2$ in the left-hand and central limb. In the two junctions of the three limbs, the magnetic voltage is equal and therefrom the magnetic fluxes in the limbs may be calculated in accordance with the operating current $i_1$ through the operating winding which consists of the partial windings 21 and 22 each comprising $n_1$ turns, and in accordance with the control current $i_2$ through the control winding 26 comprising $n_2$ turns.

If it is further taken into account that the voltage across the windings 21, 22 and 26 depends upon the flux variation and consequently upon the variations of the currents $i_1$ and $i_2$ with time, and that across the series arrangement of the windings 21 and 22 the approximately constant voltage $U_h$ of the generator 11 is set up and across the control winding 26, the voltage $U_2$ of the capacitor $C_2$ varying with time is set up, the currents and voltages can be calculated. In this case quadrupole equations may be drawn up, containing the inductance $L_a$ of the operating windings 21, 22 and the inductance $L_b$ of the control winding 26 and a mutual inductance M between the operating winding and the control winding. These inductances can be calculated from the magnetic resistances $R_1$, $R_2$ and $R_3$; the mutual inductance M is proportional to the difference between $R_1$ and $R_3$. The said mutual inductance is zero, but the magnetic resistances $R_1$ and $R_3$ are equal which is the case particularly when the magnetic fluxes are low, as in the non saturated condition. In this case, the operating windings 21, 22 and the control winding 26 are decoupled relative to one another. With comparatively large magnetic fluxes it follows therefrom that in one outermost limb the magnetic flux is increased by a part produced by the control winding but is reduced in the other outermost limb, a dissymmetry in which the outermost limb, in which the flux is increased, is saturated, but the other outermost limb is not saturated, so that $R_1 \neq R_3$. Accordingly, the quadrupole coefficients $L_a$, $L_b$ and M also are dependent upon the magnetic driving. However, inductance values can be calculated at least approximately for the oscillatory circuit formed with the capacitor $C_2$ so that the desired resonant frequencies can be adjusted.

Figure 4:
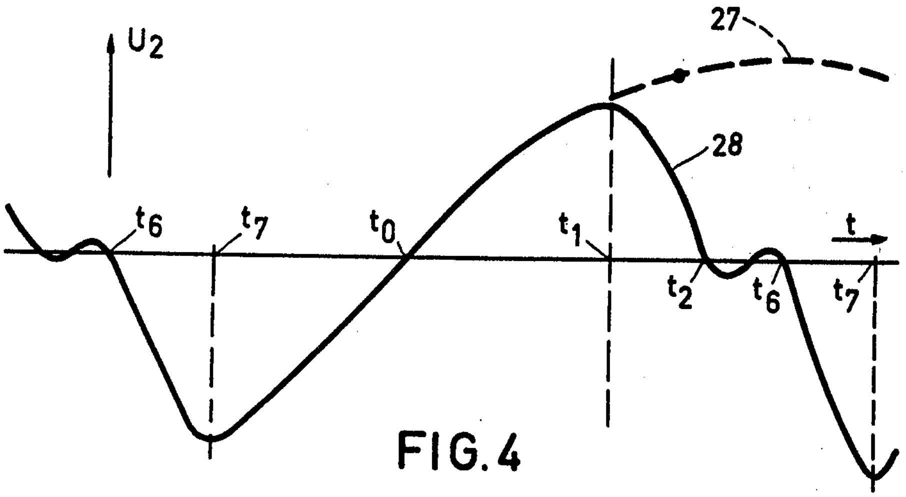
FIGURE 4 shows the voltage $U_2$ across the capacitor $C_2$ of FIGURE 1.

For this calculation it is preferable to start at the instant in the middle of the stroke shown in FIGURE 4, at which instant the currents $i_1$ and $i_2$ as well as the voltage $U_2$ across the capacitor $C_2$ are substantially zero. The transductor core then has the same permeability in all parts and, as a result of its construction, the control winding 21, 22 and the operating winding 26 are decoupled relative to one another and operate as inductances which are independent of one another and have maximum values. The inductance $L_a$ as well as the horizontal deflection coils 13 is connected to the voltage $U_h$ and consumes a current $I_h$ which is in conformity with the sawtooth current. Since this current effects no correction and causes an undesired load on the horizontal generator 11, the inductance $L_a$ in the non-saturated condition must be large with respect to the inductance $L_h$ of the deflection coils 13. As a result of this the minimum number of turns for the windings 21 and 22 is determined. The inductance $L_b$ of the control winding 26 constitutes, with the capacitor $C_2$, an oscillatory circuit with which the vertical deflection coils 17 are connected in parallel in series with the shunting capacitor 16. For the oscillations having horizontal frequencies to be considered here, the capacitor 16 has a negligible impedance and thus forms substantially a short circuit. Since the deflection current $I_v$ of the generator 14 to the deflection coils 17 must also flow through the control winding 26, the inductance $L_b$ of the said winding must be small with respect to the inductance $L_v$ of the deflection coils 17 and must be preferably approximately 10 to 20% thereof. So the inductance $L_v$ is large with respect to the inductance $L_b$ and has little influence on the frequency of the said oscillatory circuit. The stray capacitance $C_1$ also connected in parallel with the deflection coils 17 may in this connection be neglected in general.

The voltage $U_2$ across the capacitor $C_2$ is integrated by the deflection coils 17 which, for oscillations having line frequency, have a substantially inductive behaviour. To obtain the desired parabolic correction in the rhythm of the line frequency, the voltage $U_2$ must have a variation which is proportional with time. Therefore, according to the invention, the said oscillatory circuit consisting of $L_b$ and $C_2$ is tuned so that, according to FIGURE 4, the increase of the voltage in the time interval $t_0$ to $t_1$ to be considered, varies approximately linearly in accordance with the leading edge of a sinusoidal oscillation in which, preferably, a region of at least 50° to at most 70° of the sinusoidal oscillation 27 is used, until at a transition instant $t_1$ at which an outermost limb, for example, the limb comprising the winding 22, is saturated.

In a material the magnetization curve of which shows a sharp bend, said transition instant $t_1$ is sharply defined. When the material has a magnetization curve having a more even bend and is gradually saturated, a larger region is formed for the transition; for simplicity, in this case also there is made mention of a transition instant $t_1$ which may be assumed to be a point inside the transition region.

In the interval $t_7 \to t_0$ the variation of the voltage $U_2$ is identical to the variation of this voltage in the time interval $t_0 \to t_1$ but with negative polarity. This is the result of the condition that in the time interval $t_7 \to t_0$ the outermost limbs again become non-saturated (that is to say again $R_1 = R_3$) and consequently the oscillatory circuit is determined again by $I_b$ and $C_2$. Thus the instant $t_7$ may again be considered as a transition instant, but in the reverse sense, since now one of the outermost limbs (in this embodiment the limb comprising the winding 21) passes from the saturated condition into the non-saturated condition.

That in spite of the mutual decoupling of the control winding 21, 22 and the operating winding 26 in the time interval $t_7 \to t_1$ a sinusoidal variation of the voltage $U_2$ occurs across the capacitor $C_2$ is due to the fact, as will be explained below, that in the time interval $t_1 \to t_2$ and $t_6 \to t_7$ respectively, energy is accumulated in the circuit which is then operative which energy decays in the time interval $t_7 \to t_1$.

Therefore, the voltage variation $U_2$ in the time interval $t_1 \to t_2$ and the current which flows through the control winding 21, 22 in this time interval will now be discussed.

Figure 5:
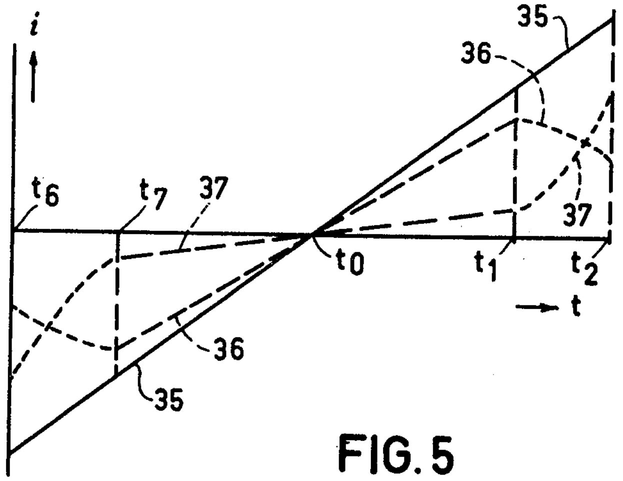
FIGURE 5 shows the currents *i* through the windings of the transductor.

After the transition instant $t_1$ one of the limbs has become saturated so that the magnetic resistance thereof ($R_3$ when the limb comprising the winding 22 is concerned), strongly increases and the part 21 of the operating winding on the other limb is rather rigidly coupled to the control 26. When it is assumed that the windings 21 and 26 after the interval $t_1$ are so rigidly coupled together that it may be said that there exists an ideal transformer action between the two windings, the winding 22 in fact lies in series with the capacitor $C_2$. If it is further assumed that the outermost limb on which the winding 22 is wound, is so strongly saturated that the winding 22 must nearly be considered as an air coil, the series arrangement of the part 22 of the operating winding and the capacitor $C_2$, is suddenly connected parallel to the deflection coil 13 after the instant $t_1$. Since the capacitor $C_2$ is comparatively large with respect to the line frequency, the impedance thereof may be considered to be low. The inductance of the winding 22 to be considered as an air coil likewise is much smaller than the impedance of the said winding in the time interval $t_7 \to t_1$ in which latter time interval in addition the winding 21 is connected in series therewith. In FIGURE 5 the current supplied by the generator 11 with the internal impedance 12 is denoted by the curve 35. It appears from this figure, that after the instant $t_1$ the current $i_1$ through the windings 21 and 22 which is denoted by the curve 37 will increase strongly at the expense of the current $I_h$ through the coil 13, which latter current is indicated by the curve 36. The current $I_h$ should actually be decreased because when the vertical current $I_v$ increases (which means that the deflection in the vertical direction is moved from the center of the image) the amplitude of the horizontal deflection gradually becomes smaller. It will also be clear that when the vertical deflection current increases, the outermost limbs of the core 24, 25 becomes saturated at earlier instants since this is the case then at a smaller value of the current $i_1$. Thus, when the vertical deflection current $I_v$ increases the instants $t_1$ and $t_7$, move in the direction of $t_0$. For an average time interval $t_1 \to t_2$ (that is to say for half the amplitude of the vertical deflection current) the circuit constituted by the winding 22 and the capacitor $C_2$ is resonating. In the same manner it can be proved that for an average time interval $t_6 \to t_7$ the circuit constituted by the winding 21 and the capacitor $C_2$ is resonating. The circuit 22, $C_2$ thus is tuned so that it resonates for the average time interval $t_1 \to t_2$, that is to say that the time interval $t_1 \to t_2$ amounts to one fourth of a cycle of the resonant oscillation of the said circuit. Since the current and the voltage across a capacitor are always shifted in phase through 90° and the current denoted by the curve 37 will also flow through the capacitor $C_2$ as a result of the above described transformation through the windings 21 and 26 in the time interval $t_1 \to t_2$, the voltage $U_2$ across the said capacitor has a shape as denoted by the curve 28.

Owing to the symmetry the same holds good for the time interval $t_6 \to t_7$.

In FIGURES 4 and 5, the situation is shown for the above average time intervals $t_1 \to t_2$ and $t_6 \to t_7$. It will be clear that for a smaller and a larger saturation of the outermost limb the above-described resonant conditions have not been fulfilled. However, for practical purposes it has been found that this only slightly deteriorates the correction current.

For a desired maximum correction of the vertical deflection current $I_v$ with a proportional part $p_v$ the capacitor voltage $U_2$ must reach approximately a value $$U_{2x} = \frac{4.L_v}{T_h} p_v.i_3$$

where $T_h = 2\,(t_2 - t_0)$ is the stroke duration and $i_3$ the deflection current actually flowing through the vertical deflection coils 17. The current $i_3$ is to be considered as the sum of the current $I_v$ which is supplied by the generator 14 and of the current which is supplied by the voltage $U_2$ to be considered as a source. As already explained in the above mentioned patent application this latter current is the integral of the voltage $U_2$. From this the value of the capacitor $C_2$ can be determined, $C_1$ being taken into account, if required.

Since, however, the voltage $U_2$ increases approximately proportionally with time only in a part $t_7 \to t_1$ of the stroke interval and produces the correct parabolic correction, the capacitance $C_2$ and, if required, $C_1$ must be chosen to be so much smaller that the parabolic current obtained by the above integration reaches the desired peak value in the available smaller interval.

In order to reach the said increase of the voltage $U_2$ which is approximately proportional with time, the oscillatory circuit, which during the time interval $t_7 \to t_1$ is formed by the inductance value $L_b$ of the winding 26 and by the capacitor $C_2$, must be tuned to be so that the duration of a cycle of the resonant oscillation of the said circuit approximately corresponds to two to three times the duration of a stroke. When the duration of a cycle of the said oscillatory circuit is chosen to be equal to 2.5 times the duration of a stroke, a value of 39 nf. for the capacitor $C_2$ and a value of 70 mh. for the inductance $L_b$ is obtained with a duration of a stroke $T_h$ of 52 μs. If the inductance of the frame coils is 110 mh., a vertical correction $p_v$ of 4% is obtained. The transductor core and the number of turns of the operating winding are chosen to be so that the inductance of the operating winding with low magnetization in the outermost limbs with a value of 300 mh. is large with respect to the inductance of 3 mh. of the deflection coils 13 and that on the other hand, if $I_v$ and consequently also the current through the control winding 26 are substantially zero, the transductor core is not driven in saturation by the sawtooth current $i_1$ through the operating windings 21, 22 which is then operative only.

As a result of this, simultaneously with the number of turns $n_1$ for the desired inductance value $L_a$ of the operating winding, the size of the core, particularly the minimum cross-section of the core, is established with a given core material.

If during the frame deflection the current $I_v$ increases, a portion determined by the control winding is added to the magnetizations through the two outermost limbs as a result of which one outermost limb becomes unsaturated but the other outermost limb becomes saturated. According as $I_v$ is larger the instant $t_1$ at which said transition takes place lies so much earlier and consequently so much nearer to the centre $t_0$ of the stroke, and so much further before the end $t_2$ of the stroke. By means of the number of turns of the control winding 26, the earliest instant $t_1$ at which the transition takes place at maximum $I_v$ can consequently be adjusted, namely preferably so that the minimum interval from $t_0$ to $t_1$, preferably is approximately 50% of the interval between the middle $t_0$ of the stroke period and the end $t_2$ thereof, and consequently approximately 25% of the stroke period $T_h$. In this case, it should be ensured, that the inductance $L_b$ of the control winding 26, when the inductance in the outermost limb of the transductor is small, remains small with respect to the inductance of the vertical deflection coils 17. If required, a larger or smaller core must be chosen.

The instant $t_1$ can preferably be displaced by varying, preferably decreasing, the ferromagnetic material of the outermost limbs at least one place. For example, the outermost limbs and/or a part of the yoke, for example, the I-part 25, may be given a thinner construction. It is also possible, if required in addition, to provide at least a part of the outermost limbs and of the connecting yoke part with notches, provided, for example, by sawing. If then the parts having a smaller magnetic cross-section are saturated, a significant variation of the slope occurs in the magnetization curve which corresponds to a transition in a more strongly saturated condition and thus to an increase of the magnetic resistance.

In the time interval $t_1 \rightarrow t_2$ the resonance oscillation of the oscillatory circuit consisting of the winding 22 and the capacitor $C_2$, and in the time interval $t_6 \rightarrow t_7$ that of the oscillatory circuit consisting of the winding 21 and the capacitor $C_2$ (the windings 21 and 22 are mutually equal), must have a duration of a cycle which corresponds to approximately 0.5 to 1.5 times the stroke period and preferably is equal to the said stroke period. Since the shape of the core, the material of the core, the number of the windings and the capacitance values are already established, it deals here with the magnetic transductor characteristic in the region in which one limb is driven considerably in saturation. This also is reached by the shape of the outermost limbs of the core already described. If, for example, the duration of oscillation in the time interval $t_1 \rightarrow t_2$ and $t_6 \rightarrow t_7$ respectively must be one third of the duration of the oscillation in the time interval $t_7 \rightarrow t_1$, the inductance of the oscillatory circuit in the time interval $t_1 \rightarrow t_2$ and $t_6 \rightarrow t_7$ respectively, must be one ninth of that of the time interval $t_7 \rightarrow t_1$. From the above indicated quadrupole coefficients, which contain the magnetic resistances $R_1$, $R_2$ and $R_3$, it can be calculated in what ratio the steepness of the magnetization curve, which is measure of the inductance of the oscillatory circuit, must decrease. In an embodiment a ratio of approximately 24:1 was found. Such a variation can particularly easily be reached if the material, for example, a manganese-zinc-ferrite, has a high initial permeability which on saturation of a part of the outermost limbs, is decreased by providing an air gap.

If the variation of the inductance $L_b$ of the control winding 26 at the transition instants $t_1$ and $t_7$ respectively is too large, the influence thereof may be reduced by connecting, as shown in FIGURE 1 by broken lines, a fixed inductance 31 in parallel and/or in a corresponding manner a fixed inductance 32 in series. The inductance 32 may also be used for compensation purposes in which it can advantageously be adjusted in the region between 1 and 20% and preferably between 5 and 10% of the inductance $L_b$. By an inductance 33, which is likewise shown in broken lines shown in FIGURE 1, which is connected in the circuit of the operating winding 21, 22 and which may be adjustable, the correction amplitude for the two deflection circuits may be reduced in common.

An adaptation to the given ratios may also be obtained by connecting the junction with the generator 14 and/or with the deflection coils 17 to a tap of the control winding 26.

The above explained rules for proportioning determine the variation of the oscillation. As a result of the periodicity of the applied oscillations, the current and voltages, as shown in FIGURE 4 for $U_2$, during the stroke lie symmetrically with respect to the middle of the stroke; at the beginning of the stroke from $t_6$ a more or less sinusoidal increase of the capacitor voltage $U_2$ consequently takes place up to $t_7$ having a polarity which is opposite with respect to the voltage at the instant $t_1$, and then a more or less sinusoidal decrease up to the middle of the stroke $t_0$ takes place. Then the variation already described occurs. During the fly-back ($t_2$ to $t_6$) a reverse variation occurs in a far shorter period by the voltage set up across the operating winding, having opposite polarity and a considerably higher amplitude, in which period oscillations can hardly be generated since the resonant circuits formed are not tuned to the much shorter duration of a cycle in the fly-back period. So exclusively an alteration of the variation of the magnetic fluxes takes place so that at the end of the fly-back a situation is reached which is opposite with respect to the end of the fly-back.

It appears that at the beginning of the stroke a strong amplitude peak occurs in the operating current $I_1$ as a result of which energy is derived from the horizontal deflection coils 13 and supplied to the capacitor $C_2$ through the transductor. In the middle part of the horizontal stroke $T_h$ the energy at the capacitor $C_2$ interacts with the deflection coils 17 and generates there a parabolic current which produces the desired correction. However, as described, a correction of the horizontal deflection current $I_h$ which depends upon the value of the vertical deflection current $I_v$ occurs in the time intervals $t_1 \rightarrow t_2$ and $t_6 \rightarrow t_7$. So periodically a transmission of a quantity of energy effecting the correction and reciprocating between the horizontal deflection circuit and the vertical deflection circuit takes place, in which the transductor 23 only serves as a switch and a transformer respectively, and need store only very little energy itself. From this it follows that the transductor core can be very small and that only low losses occur since the correction energy reciprocates as an oscillation between the two deflection circuits (that is to say, the winding 26 with the capacitor $C_2$ at one side and the windings 21 and 22 respectively with the capacitor $C_2$ on the other).

From this it follows, however, that in general a correction which is exact at any point cannot be reached. In fact, as shown in FIGURE 5, for an exact correction of the horizontal current, the current $i_1$ would have to vary in the form of a sawtooth in accordance with the vertical current $I_v$ throughout the stroke interval in accordance with curve 35 of FIGURE 5. Actually, however, the horizontal deflection current $I_h$ varies as indicated by curve 36 in FIGURE 5. However, this has substantially no deformation of the deflection for its result since an S-shaped correction is necessary all the same and the curve 36 approaches the desired S-shape.

Accordingly, for an exact parabolic correction of the vertical deflection current $I_v$, the capacitor voltage $U_2$ would have to vary in the form of a sawtooth throughout the stroke interval. In fact, however, as explained above, the ends 28 of the voltage curve $U_2$ are bent cosinusoidally at the beginning and at the end of the stroke, so that the parabolic frame correction takes place only in a part of the stroke period. It has been found that the frame deflection errors still present then lie below a limit of 1 to 1.5% and are not disturbing, whereas the errors between approximately 3% and 6% occurring without frame correction are highly disturbing. So it is sufficient that a satisfactory correction is reached in the regions in which the admissible error limit is surpassed.

What is claimed is:

1. In a deflection system for a cathode ray tube, wherein said system is of the type having first and second deflection coil means arranged to deflect the beam of said tube in orthogonal directions, a source of a first and second deflection signals connected to said first and second deflection coil means respectively, the frequency of said first signal being higher than the frequency of said second signal, and deflection correction means comprising a transductor having first, second and control windings on a saturable core, means connecting said first and second windings in a series circuit, means connecting said series circuit in parallel with said first deflection coil means, means connecting said control winding in series with said second deflection coil means, a capacitor, and means connecting said capacitor in parallel with said control winding means, whereby the portions of said core on which said first and second windings are wound are separably saturable in response to current flow in opposite directions in said control winding; the improvement wherein said control winding has an inductance when said core is unsaturated that forms a resonant circuit with said capacitor at a frequency having a period from two to three times the stroke period of said first deflection signals, and each of said first and second windings have inductances, when the respective portions of the core on which they are wound are saturated, that form resonant circuits with said capacitor at a frequency having a period from 0.5 to 1.5 times said stroke period.

2. In a television deflection system of the type having horizontal and vertical deflection coils, a source of line and frame deflection signals, means applying said line and frame deflection signals to said line and frame deflection coils respectively, and raster distortion correction means comprising a transductor having a saturable core with a center limb and first and second outer limbs, a control winding on said center limb connected in series with said frame deflection coils, an operative winding connected in parallel with said line deflection coils and having first and second oppositely wound winding portions on said first and second outer limbs respectively, capacitor means, and means connecting said capacitor means in parallel with said control winding, whereby said first and second winding portions are coupled to each other and are not coupled to said control winding when said core is unsaturated, and said first and second winding portions are coupled to said control winding and not to each other when said second and first limbs respectively of said core are saturated; the improvement wherein said control winding has an inductance when said core is unsaturated whereby said control winding and capacitor means are resonant at a frequency having a period that is two to three times the stroke period of said line deflection signals, and said first and second winding portions have inductances when said first and second limbs respectively are saturated that resonate with said capacitor means at a frequency having a period that is 0.5 to 1.5 times said stroke period.

3. The deflection system of claim 2 wherein the inductance of said operative winding when said core is unsaturated is large with respect to the inductance of said line deflection coils.

4. The deflection system of claim 2 wherein the inductance of said control winding when said core is unsaturated is small with respect to the inductance of said frame deflection coils.

References Cited

UNITED STATES PATENTS

| | | | |
|---|---|---|---|
| 2,906,919 | 9/1959 | Thor et al. | |
| 3,329,859 | 7/1967 | Lemke | 315—24 |
| 3,329,861 | 7/1967 | Barkow et al. | |
| 3,329,862 | 7/1967 | Lemke | 315—27 |
| 3,346,765 | 10/1967 | Barkow. | |

RODNEY D. BENNETT, *Primary Examiner.*
MALCOLM F. HUBLER, *Assistant Examiner.*